United States Patent
Mishra

(10) Patent No.: US 10,140,651 B1
(45) Date of Patent: Nov. 27, 2018

(54) DISPLAYING ITEM INFORMATION RELATIVE TO SELECTION REGIONS OF AN ITEM IMAGE

(71) Applicant: Amazon Technologies, Inc., Seattle, WA (US)

(72) Inventor: Pushpendra Narain Mishra, Utter Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 566 days.

(21) Appl. No.: 14/513,756

(22) Filed: Oct. 14, 2014

(51) Int. Cl.
*G06Q 30/00* (2012.01)
*G06Q 30/06* (2012.01)
*G06F 3/0484* (2013.01)
*G06F 3/0488* (2013.01)

(52) U.S. Cl.
CPC ....... *G06Q 30/0643* (2013.01); *G06F 3/0488* (2013.01); *G06F 3/04842* (2013.01); *G06F 3/04845* (2013.01); *G06Q 30/0623* (2013.01); *G06Q 30/0641* (2013.01)

(58) Field of Classification Search
CPC ........ G06Q 30/0601–30/0645; G06F 3/04845; G06F 3/0488; G06F 3/04842
USPC ........... 705/26.1–27.2, 26.61, 27.1; 345/419, 345/619, 649, 653
See application file for complete search history.

(56) References Cited

U.S. PATENT DOCUMENTS

| | | | | |
|---|---|---|---|---|
| 9,177,224 B1* | 11/2015 | Heller | ............. | G06K 9/52 |
| 2002/0075333 A1* | 6/2002 | Dutta | ............. | G06F 3/04842 |
| | | | | 715/862 |
| 2004/0249727 A1* | 12/2004 | Cook, Jr. | ............. | G06Q 10/10 |
| | | | | 705/26.81 |
| 2008/0247636 A1* | 10/2008 | Davis | ............. | G06T 19/00 |
| | | | | 382/152 |
| 2013/0002699 A1* | 1/2013 | Watanabe | ............. | G06T 11/40 |
| | | | | 345/589 |
| 2015/0026637 A1* | 1/2015 | Ross | ............. | G06F 3/0481 |
| | | | | 715/810 |

OTHER PUBLICATIONS

Gould, Lawrence S. PDF Goes 3D: Forget Mailing Paper Documents. Forget Emailing Two-Dimensional GIF, JPEG, and TIFF Graphic Images with Explanatory Notes in Some Word Processed File. Now You Can Navigate Through and Manipulate 3D Models in PDF Documents. Accessed on Jul. 11, 2018 (Jul. 11, 2018). (Year: 2006).*

* cited by examiner

*Primary Examiner* — Michael Misiaszek
*Assistant Examiner* — Allison G Wood
(74) *Attorney, Agent, or Firm* — Thomas Horstemeyer, LLP

(57) ABSTRACT

Disclosed are various embodiments for displaying item information relative to selection regions of an item image. An image of an item is rendered upon a display of a client. The image is divided into multiple selection regions. The selection regions may be determined by the client dynamically. A selection of a first point upon the image of the item is received. Additional information related to the item is requested from a server based at least in part on the selection of the first point. The additional information is mapped to the first point by way of an association with a second point upon the image. The additional information related to the item is rendered upon the display.

20 Claims, 8 Drawing Sheets

DISPLAYING ITEM INFORMATION RELATIVE TO SELECTION REGIONS OF AN ITEM IMAGE

BACKGROUND

Online retailers typically provide a detail page for each item in their electronic catalogs. The detail page may contain a variety of information about the respective item. For example, the detail page may have the title of the item, the price of the item, various options for the item, multiple images of the item, customer reviews and ratings for the item, specifications for the item, other items that are similar to or are accessories for the item, and so on. While such detail pages may look great on large-format displays of desktops and laptops, a detail page may lack usability when rendered upon a small-format display of a smartphone or tablet.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to displaying item information relative to selection regions of an item image. In the context of small-format displays, such as those of smartphones, tablets, and other handheld devices, a detail page may present too much information. The screen may appear cluttered, and the detailed information may be rendered in text that is too small for reading. Item images may also be of interest, but their sizes may be too small to show detail. As a result, a user may frequently have to zoom in upon portions of the page and scroll to other portions. Such actions may be cumbersome to perform on a touch display, and consequently, the detail page may lack usability.

Various embodiments of the present disclosure provide a user interface focusing upon item images to present detailed item information. In one embodiment, a single item image may be rendered upon a handheld display. This item image may correspond to a rendering of a three-dimensional model of the item, where the model may be manipulated by the user and the rendering may be updated. Touching specific areas upon the image may cause specific details to be rendered upon the user interface. As the user touches different areas of the image, different information may be shown. Consequently, the user may be able to see all the details of the item by just moving his or her finger on the image of the item.

Figure 1:
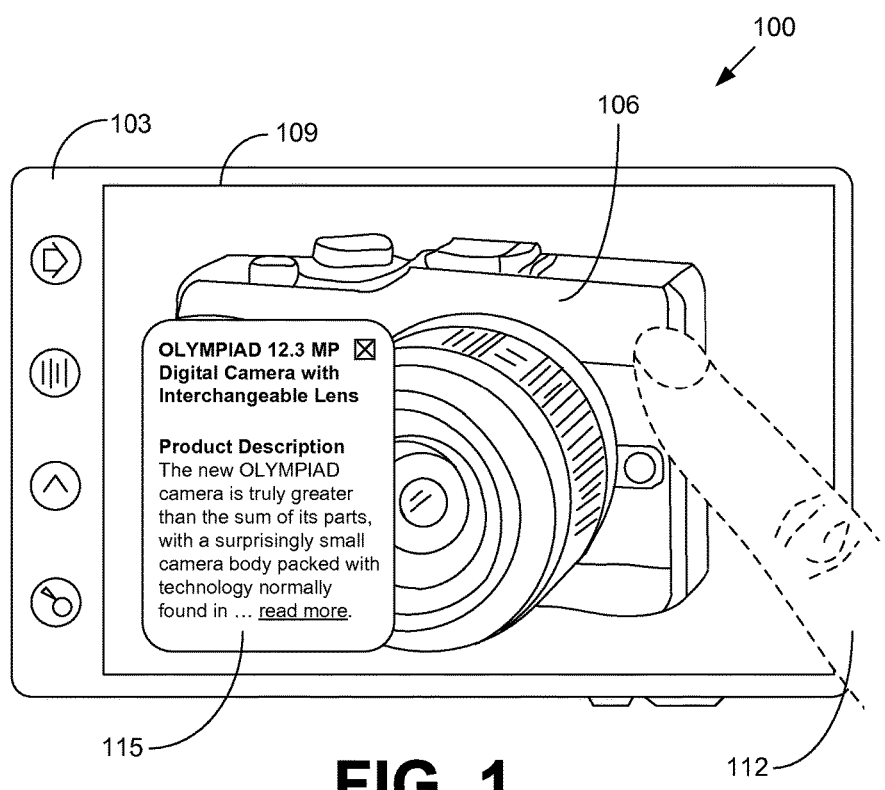
FIG. 1 is a drawing of an example scenario involving a mobile device according to various embodiments of the present disclosure.

With reference to FIG. 1, shown is a drawing of an example scenario 100 involving a mobile device 103 according to various embodiments. In this example scenario 100, a user interface 106 is rendered upon a touchscreen 109 of the mobile device 103. The user interface 106 depicts an image of an item offered via an electronic marketplace. Here, the item is a digital camera. The image of the item substantially fills the touchscreen 109, thereby providing a user 112 with a detailed view of the item depicted by the image. The user 112 may be able to perform various actions upon the image via gestures such as rotating, zooming, spinning, panning, etc.

Initially, it may be that no text or description is rendered upon the user interface 106. However, upon a touch by the user 112 at a given point, additional information 115 is rendered upon the user interface 106. In this example, the additional information 115 corresponds to a detailed product description of the item. The user interface 106 may be divided dynamically into multiple regions based upon the current rendering of the image, where touching a particular region will cause additional information 115 associated with that region to be rendered upon the user interface 106. Different additional information 115 may be associated with each of the multiple regions, so the user is able to view many details about the item depicted in the image by merely touching various points upon the image.

The additional information 115 may partially obscure the image of the item or may be rendered in an area of the user interface 106 that does not interfere with the image of the item. In one embodiment, the additional information 115 is hidden when the user 112 stops touching the touchscreen 109 at the given point or at a predetermined time thereafter. In another embodiment, the additional information 115 may persist on the user interface 106 until it is closed via a close button. In yet another embodiment, the additional information 115 may persist on the user interface 106 until the user touches another point on the touchscreen that is associated with different additional information 115.

In the following discussion, a general description of the system and its components is provided, followed by a discussion of the operation of the same.

Figure 2:
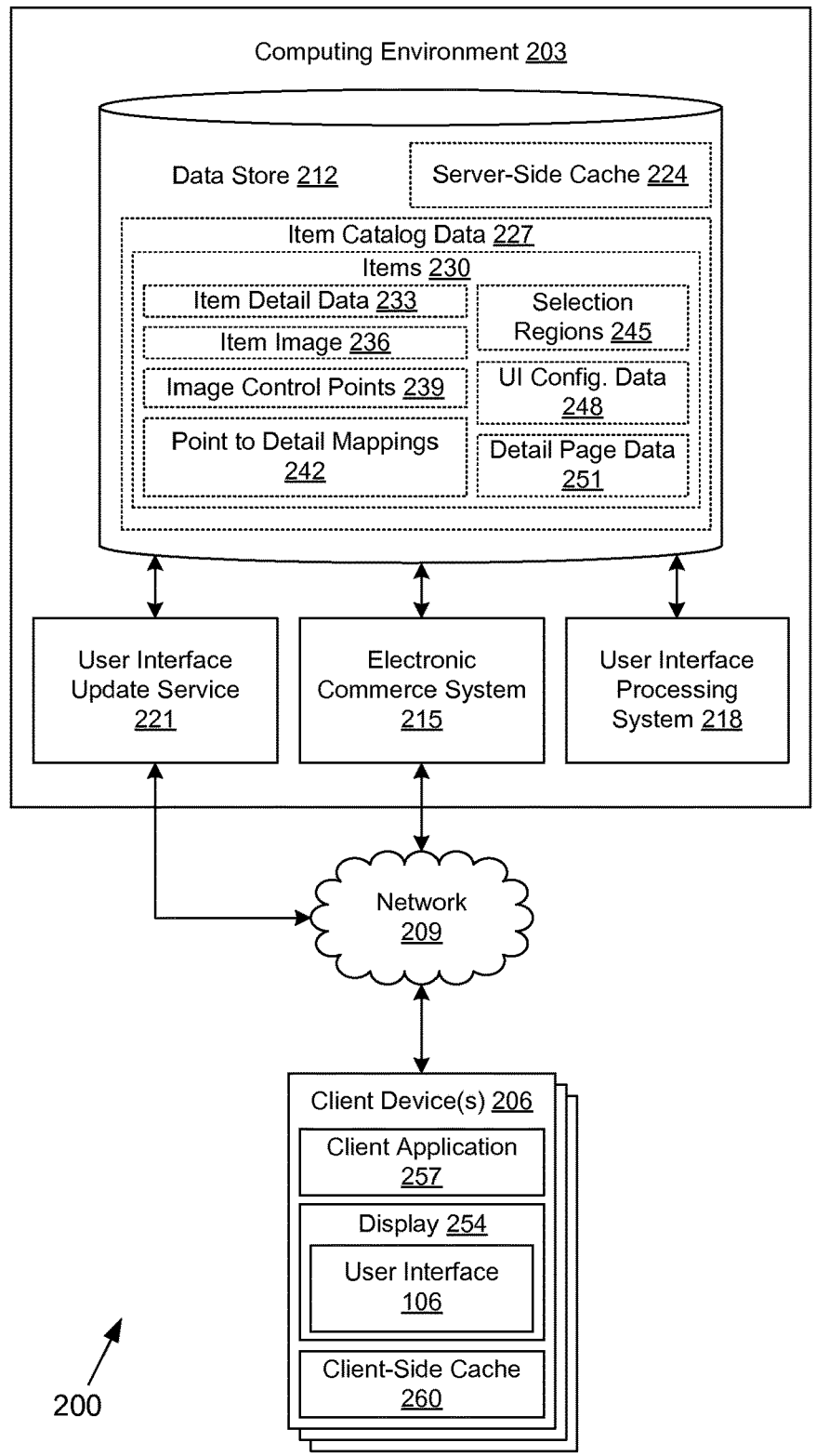
FIG. 2 is a schematic block diagram of a networked environment according to various embodiments of the present disclosure.

Moving on to FIG. 2, shown is a networked environment 200 according to various embodiments. The networked environment 200 includes a computing environment 203 and one or more client devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an electronic commerce system 215, a user interface processing system 218, a user interface update service 221, and other applications, services, processes, systems, engines, or functionality not discussed in detail herein. The electronic commerce system 215 is executed in order to facilitate the online purchase of items over the network 209 through an electronic marketplace in which one or more sellers participate. The electronic marketplace may be operated by a proprietor who may also be a seller. The electronic commerce system 215 also performs various backend functions associated with the online presence of a seller in order to facilitate the online purchase of items. For example, the electronic commerce system 215 may generate network content such as web pages, mobile application data, or other forms of content that are provided to client devices 206 for the purposes of selecting items for purchase, rental, download, lease, or other forms of consumption.

The user interface processing system 218 may be executed to perform various forms of processing on data used to generate user interfaces. Such processed data may, for example, be stored in a server-side cache 224 in the data store 212. The user interface update service 221 may be executed to provide dynamic data updates to a client device 206 via the network 209. The dynamic data updates may be used to render additional information 115 (FIG. 1) in a user interface 106 (FIG. 1) upon a user selection of a point upon the user interface 106.

The data stored in the data store 212 may include, for example, a server-side cache 224, item catalog data 227, and potentially other data. Other data such as order data, shopping cart data, wish list data, browse history data, order fulfillment data, and so on may also be stored in the data store 212 for use by the electronic commerce system 215. The server-side cache 224 may be used to store various dynamically generated data in order to improve rendering speed for network pages and other forms of user interfaces 106 that include dynamic network content.

The item catalog data 227 may store data relating to a variety of items 230 offered for sale, download, rental, and/or other forms of consumption via the electronic commerce system 215. The items 230 may comprise products, goods, services, digital downloads, and/or any other item that may be offered via the electronic commerce system 215. Each item 230 may be associated with various data, for example, item detail data 233, one or more item images 236, image control points 239, point to detail mappings 242, selection regions 245, user interface (UI) configuration data 248, detail page data 251, and/or other data.

The item detail data 233 may comprise various information about the item 230, which may include, for example, title, price, availability, categories, customer reviews, customer ratings, manufacturers, specifications, detailed description, warranty information, accessories and related items 230, and/or other information. The item image 236 may correspond to a representative image of the item 230. In some cases, multiple item images 236 for an item 230 corresponding to multiple views and/or variations may be provided. In one scenario, the item image 236 may correspond to a three-dimensional model that may be rendered as a two-dimensional image. Such an item image 236 may be referred to as a three-dimensional image.

The image control points 239 may correspond to points of interest upon an item image 236 or an underlying three-dimensional model. The image control points 239 may be extracted by an automated algorithm and/or may be specified manually. In some embodiments, the image control points 239 may be dynamically generated in real-time at least based on a current rendering of the item image 236 by a client device 206. In one example, a transform may be applied to a reference set of image control points 239 at least based on a transform applied to a reference version of the item image 236 in a current rendering of the item image 236 by a client device 206. In another example, the image control points 239 may correspond to features automatically extracted from a current rendering of the item image 236 by a client device 206. Various approaches may be used to automatically recognize components of a displayed product, including edge detection algorithms, corner detection algorithms, blob detection algorithms, template matching algorithms, and so on. Each recognized component may be assigned a corresponding image control point 239.

As a non-limiting example, where an item 230 has a rectangular shape and three sides are visible in the item image 236, there may be three image control points 239, e.g., one for each visible side. Generally, there may be a separate image control point 239 for each feature or part of an item 230 depicted in an item image 236. Additional control points may also be provided.

The point to detail mappings 242 may associate each of the image control points 239 with a set of information selected from the item detail data 233. The point to detail mappings 242 may be dynamically generated in real-time at least based on the image control points 239, which also may be dynamically generated in real-time.

The selection regions 245 may divide the item image 236 into multiple areas based at least in part on the image control points 239. The selection regions 245 may be dynamically generated in real-time for a current rendering of an item image 236 by a client device 206 at least based on dynamically generated image control points 239. In one embodiment, the selection regions 245 may correspond to Voronoi regions generated from the image control points 239 based upon the current rendering or view of the item image 236, with each image control point 239 being associated with a single selection region 245. Alternatively, an algorithm may be applied to the item image 236 to extract features from the item image 236, and each extracted feature may produce a corresponding selection region 245.

The UI configuration data 248 may define various parameters that control how a user interface 106 that depicts an item image 236 functions. For example, the UI configuration data 248 may define behavior relating to how long additional information 115 is to be shown after a touch, and so on. The UI configuration data 248 may specify where the additional information 115 is rendered, e.g., on top of the item image 236, alongside the item image 236, in a box having a specific height and width, etc. The detail page data 251 may comprise data corresponding to a detail network page for an item 230. Such a detail page may include a variety of item images 236 and item detail data 233.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 254. The display 254 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the display 254 may correspond to a touchscreen 109 (FIG. 1).

The client device 206 may be configured to execute various applications such as a client application 257 and/or other applications. The client application 257 may be executed in a client device 206, for example, to access network content served up by the computing environment 203 and/or other servers, thereby rendering a user interface 106 on the display 254. To this end, the client application 257 may comprise, for example, a browser, a dedicated application, etc., and the user interface 106 may comprise a network page, an application screen, etc. The client device 206 may be configured to execute applications beyond the client application 257 such as, for example, email applications, social networking applications, word processors, spreadsheets, and/or other applications. The client device 206 may also include a client-side cache 260 to store data obtained via the network 209 from the computing environment 203 and/or data generated by the client application 257.

Next, a general description of the operation of the various components of the networked environment 200 is provided. To begin, various image control points 239 are defined for an item image 236. For example, an administrator may employ a management user interface to select various image control points 239 upon an item image 236 or upon a three-dimensional model underlying an item image 236. Alternatively, the image control points 239 may be generated dynamically in real-time by the user interface processing system 218 according to a current rendering of an item image 236 by a client device 206. The image control points 239 are mapped to specific additional information 115 from the item detail data 233 via the point to detail mappings 242, which also may be generated dynamically and in real-time.

In one embodiment, the user interface processing system 218 may dynamically generate the selection regions 245 for an item image 236 from the image control points 239. The selection regions 245 may correspond to a current rendering of the item image 236 by the client device 206. For example, the user interface processing system 218 may dynamically generate Voronoi regions corresponding to the selection regions 245. The selection regions 245 may completely divide the item image 236. The selection regions 245 may be cached by the server-side cache 224. In another embodiment, the selection regions 245 may be generated in real-time in the client device 206 by the client application 257 based upon the current rendering of the item image 236. For example, edge detection algorithms, blob detection algorithms, template matching algorithms, etc., may be used to extract features from the current rendering of the item image 236. The selection regions 245 may be cached in the client device 206 by the client-side cache 260.

A user 112 (FIG. 1) at the client device 206 requests information about an item 230 via a client application 257. For example, the user 112 may select a link or otherwise request a detail page for the item 230. The electronic commerce system 215 may generate the detail page using the detail page data 251 and/or other data and send the detail page to the client device 206 by way of the network 209. From the detail page, the user 112 may select a particular item image 236 to be maximized upon the display 254. Alternatively, the user 112 may request that the item image 236 be rendered upon the display 254 via another approach.

The electronic commerce system 215 then sends the item image 236 via the network 209 to the client device 206 for rendering upon the display 254. The client application 257 in one embodiment may be configured to substantially fill the display 254 with the item image 236. The electronic commerce system 215 may also send a selection layer comprising code implementing the selection regions 245 to the client device 206.

When the item image 236 is rendered in the user interface 106 and the user 112 selects a particular selection region 245 via a touch, mouse click, hovering the mouse, etc., additional information 115 corresponding to the particular selection region 245 is rendered upon the user interface 106. The additional information 115 may be selected from the item detail data 233. In some cases, the additional information 115 may not be present at the client device 206, and the client application 257 may be configured to request additional data from the user interface update service 221. This additional data may correspond to item detail data 233 and/or other data. The additional data may be cached in the client-side cache 260 for future use by the client application 257. In this way, the user 112 may browse any amount of item detail data 233 simply by selecting various points upon the item image 236.

Figure 3A:
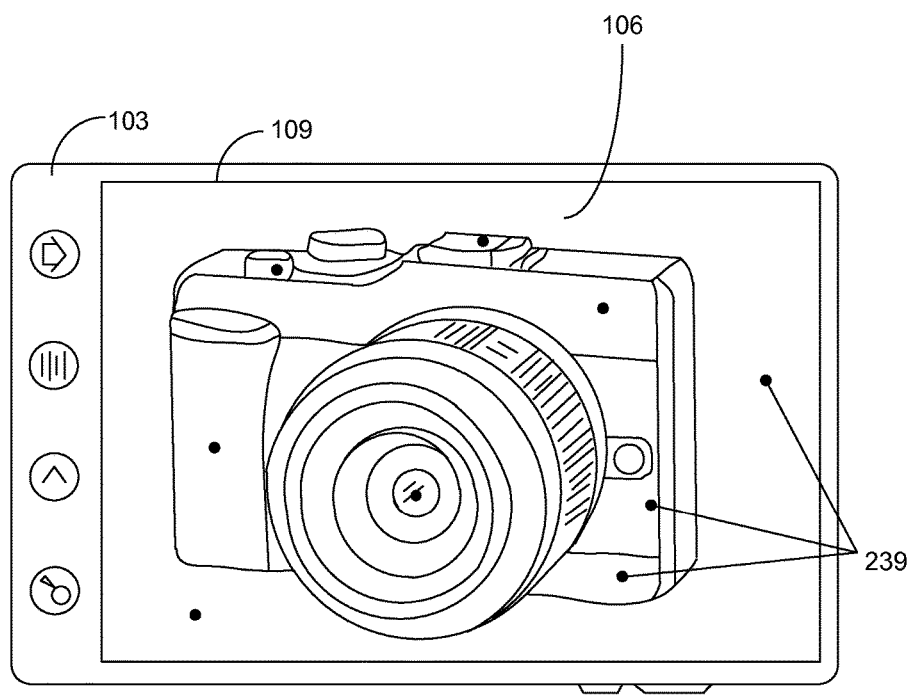
FIGS. 3A-3C are pictorial diagrams of example user interfaces rendered by a client device in the networked environment of FIG. 2 according to various embodiments of the present disclosure.

Referring next to FIG. 3A, shown is one example of a user interface 106 rendered upon the mobile device 103 of FIG. 1, which corresponds to a client device 206 (FIG. 2). The user interface 106 shows a current rendering of a three-dimensional item image 236, where the rendering is at least based on a user manipulation or selection. For purposes of illustration, various image control points 239 are shown upon the user interface 106a. These image control points 239 may be extracted dynamically in real-time from the current rendering of the item image 236. For example, if the user rotates the camera shown in FIG. 3A, the image control points 239 may be dynamically extracted again for the updated rendering. Alternatively, a transformation corresponding to the user manipulation may be applied to reference image control points 239.

In various embodiments, the image control points 239 may be hidden or may be rendered with markers hinting at the additional information (FIG. 1) with which they are associated. Where the item 230 (FIG. 2) is a camera, a given image control point 239 may be marked, for example, with the text "Lens." Where a cursor is present, a corresponding marker may be made visible upon hovering the cursor over a respective image control point 239 or a respective image selection region 245.

Figure 3B:
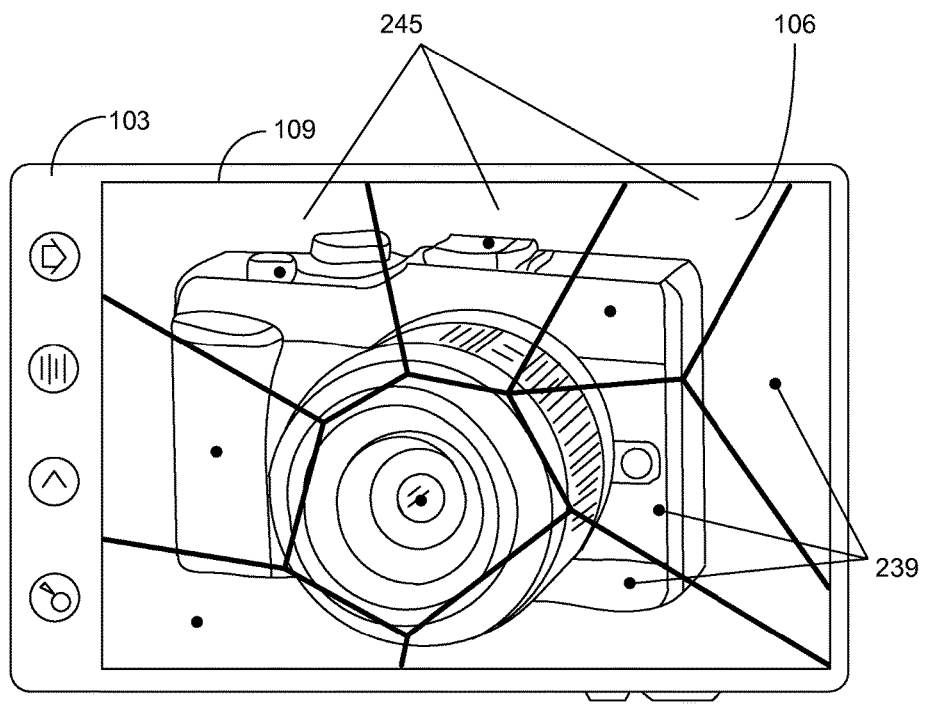

Turning now to FIG. 3B, shown is another example of a user interface 106 rendered upon the mobile device 103 of FIG. 1, which corresponds to a client device 206 (FIG. 2). For purposes of illustration, the corresponding selection regions 245 are rendered for the image control points 239 previously shown in FIG. 3A. Here, the selection regions 245 may correspond to Voronoi regions generated from the image control points 239. In other embodiments, the selection regions 245 may be automatically generated via feature extraction approaches. Although boundaries of the selection regions 245 are shown in FIG. 3B, it is understood that the selection regions 245 may not be demarcated by visible boundaries upon the user interface 106.

Making a selection anywhere within a particular selection region 245 will cause the additional information 115 (FIG. 1) associated with that selection region 245 to be rendered upon the user interface 106. The selection may comprise a brief touch by the user, a long press, a swipe, a mouse click, a mouse hover, or other types of selection. In one embodiment, each of the selection regions 245 is associated with different types of additional information 115 to be populated from the item detail data 233 (FIG. 2). For example, a selection region 245 around the battery compartment area of a camera item 230 (FIG. 2) may cause additional information to be shown about the types of batteries used by the camera item 230.

Figure 3C:
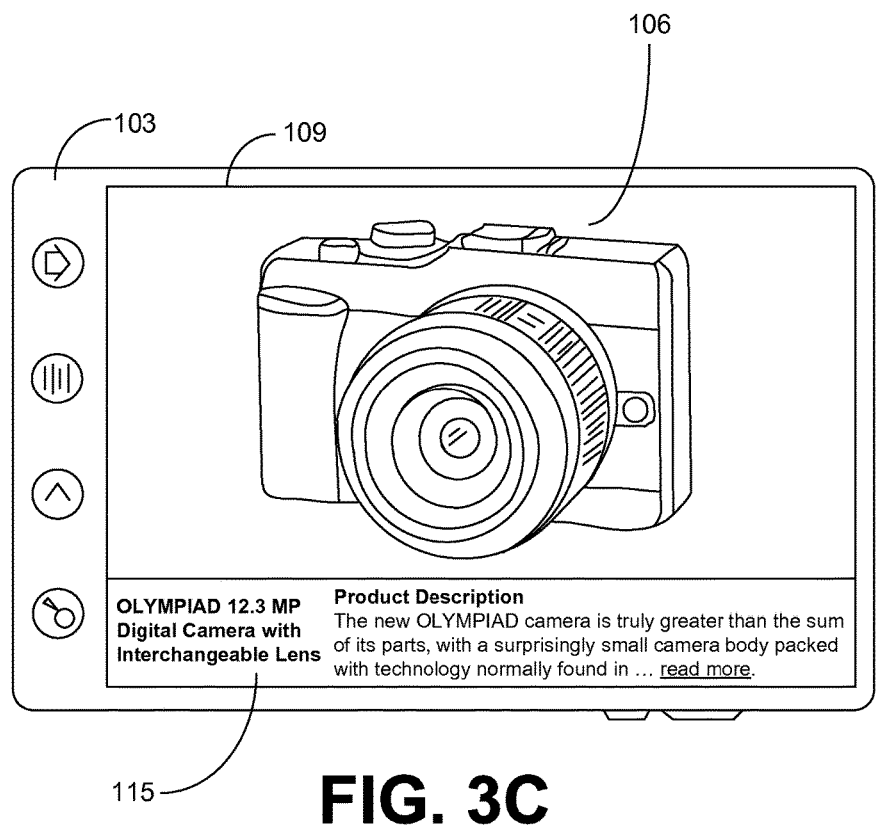

Moving on to FIG. 3C, shown is another example of a user interface 106 rendered upon the mobile device 103 of FIG. 1, which corresponds to a client device 206 (FIG. 2). As compared to FIG. 1, the additional information 115 is rendered differently. Rather than using a pop-over dialog that may partially obscure the item image 236 (FIG. 2), the additional information 115 is rendered in a dedicated side panel of the user interface 106. This side panel may expand or contract in response to user input. For example, swiping up may cause the panel to fill the entire screen, while swiping down may cause the panel to disappear or to be minimized. The content of the additional information 115 that is rendered may depend upon a current selection region 245 that is selected by the user 112 (FIG. 1). The user 112 may scroll within the panel by using a gesture upon the touchscreen 109, reorienting the mobile device 103, and/or other approaches.

Figure 4:
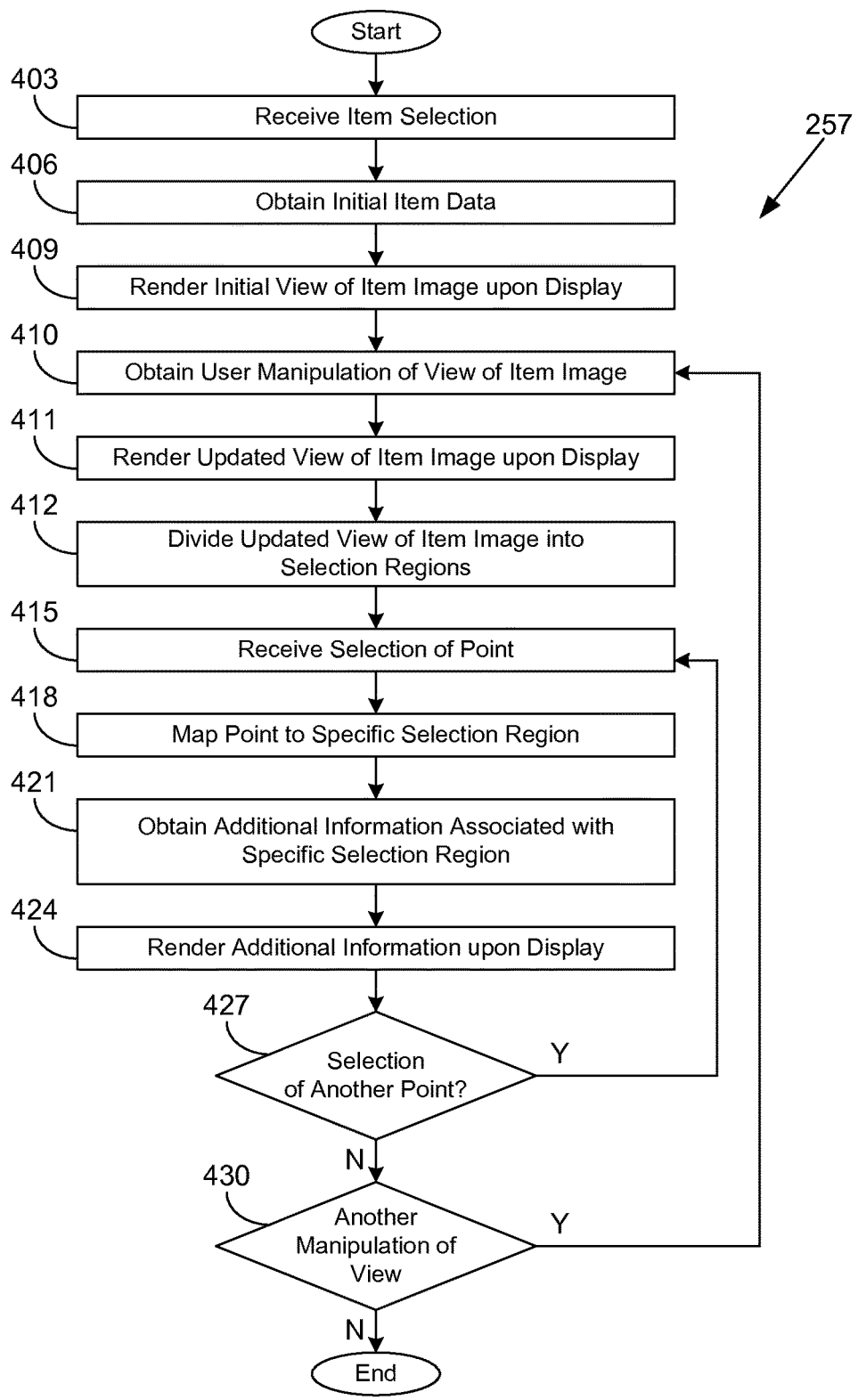
FIG. 4 is a flowchart illustrating one example of functionality implemented as portions of a client application executed in a client device in the networked environment of FIG. 2 according to various embodiments of the present disclosure.

Referring next to FIG. 4, shown is a flowchart that provides one example of the operation of a portion of the client application 257 according to various embodiments. It is understood that the flowchart of FIG. 4 provides merely an example of the many different types of functional arrangements that may be employed to implement the operation of the portion of the client application 257 as described herein. As an alternative, the flowchart of FIG. 4 may be viewed as depicting an example of elements of a method implemented in the client device 206 (FIG. 2) according to one or more embodiments.

Beginning with box 403, the client application 257 receives a selection of a particular item 230 (FIG. 2) offered via an electronic catalog via the electronic commerce system 215 (FIG. 2). In box 406, the client application 257 obtains initial data associated with the item 230. For example, this initial data may include one or more item images 236 (FIG. 2) and data to implement the user interface 106 (FIG. 1) upon the client device 206. This data may include, for example, JAVASCRIPT, extensible markup language (XML), hypertext markup language (HTML), and/or other data.

In box 409, the client application 257 renders a user interface 106 containing an initial view of an item image 236 on the display 254 (FIG. 2). For example, the item image 236 may substantially fill the display 254. In box 410, the client application 257 obtains a user manipulation of the view of the item image 236. For example, the user may perform a gesture associated with a rotation function, a zooming function, a panning function, a spinning function, or another function that manipulates the view of the item image 236 in some way. The manipulation may have a two-dimensional effect or a three-dimensional effect upon the item image 236. In one scenario, the item image 236 corresponds to a two-dimensional rendering of a three-dimensional model of the item 230. In box 411, the client application 257 renders an updated view of the item image 236 upon the display 254 in response to the user manipulation of the view.

In box 412, the client application 257 may divide the updated view of the item image 236 into a plurality of selection regions 245 (FIG. 2) based at least in part on a plurality of image control points 239 (FIG. 2). The image control points 239 may be specified relative to the initial view of the item image 236, and may be transformed to the updated view of the item image 236. In a three-dimensional rendering context, the image control points 239 may be initially specified in a three-dimensional space and may be transformed to a two-dimensional space corresponding to the updated view of the item image 236. The division of the updated view of the item image 236 into the selection regions 245 may occur in real-time in response to the user manipulation obtained in box 410. In one alternative, the particular item image 236 as manipulated by the user may be processed to recognize different parts of the item image 236. Image control points 239 may then be dynamically assigned, point to detail mappings 242 (FIG. 2) may be updated, and so on. Alternatively, the updated view of the item image 236 may be predivided into the selection regions 245 by way of the user interface processing system 218 (FIG. 2), and data encoding the selection regions 245 may be sent to the client application 257. In some cases, a layer may be rendered on top of the item image 236 that contains markers that individually correspond to the selection regions 245.

In box 415, the client application 257 receives a user selection of a point upon the user interface 106 and upon the item image 236. For example, the user may touch a specific point using a touchscreen 109 (FIG. 1) or may select the specific point via a mouse click, mouse hover, etc. In box 418, the client application 257 maps the point to a specific selection region 245. That is to say, the client application 257 may determine whether the point is within a selection region 245. In one embodiment, this mapping may be performed at the server-side by way of the user interface update service 221 (FIG. 2). For example, a request may be sent to the user interface update service 221 that specifies the coordinates of the point, and an identification of the selection region 245 or specific additional information 115 (FIG. 1) may be returned.

In box 421, the client application 257 obtains additional information 115 associated with the specific selection region 245. The association may be determined via the point to detail mappings 242 (FIG. 2) indicated for the corresponding image control point 239 for the specific selection region 245. The client application 257 may load the additional information 115 from a client-side cache 260 (FIG. 2) or may request the additional information 115 from the user interface update service 221 via the network 209 (FIG. 2). The additional information 115 may correspond to customer reviews of the item 230, a description of a part of the item 230, a warranty for the item 230, a manufacturer of the item 230, and/or other information from the item detail data 233 (FIG. 2). In box 424, the client application 257 renders the additional information 115 upon the display 254.

In box 427, the client application 257 determines whether a selection of another point is made. If another point is selected, the client application 257 returns to box 415 and receives the selection of the other point. Otherwise, the client application 257 moves to box 430 and determines whether another user manipulation of the view of the item image 236 is made. If so, the client application 257 returns to box 410 and obtains the other user manipulation of the view of the item image 236. Otherwise, the operation of the portion of the client application 257 ends.

Figure 5:
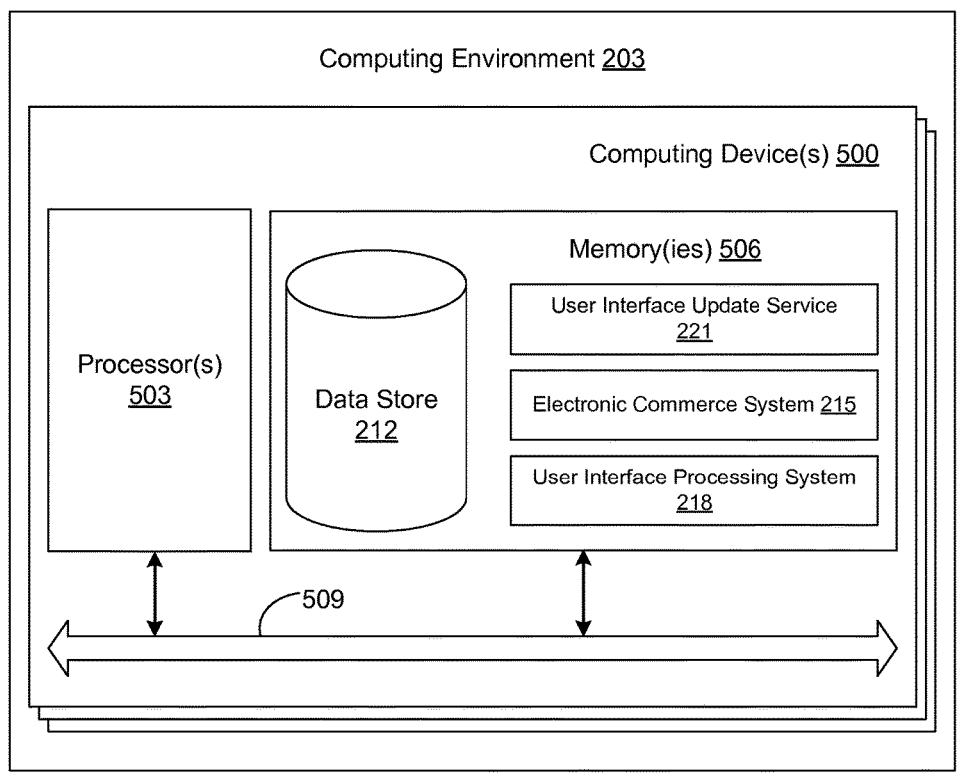
FIG. 5 is a schematic block diagram that provides one example illustration of a computing environment employed in the networked environment of FIG. 2 according to various embodiments of the present disclosure.
Figure 6:
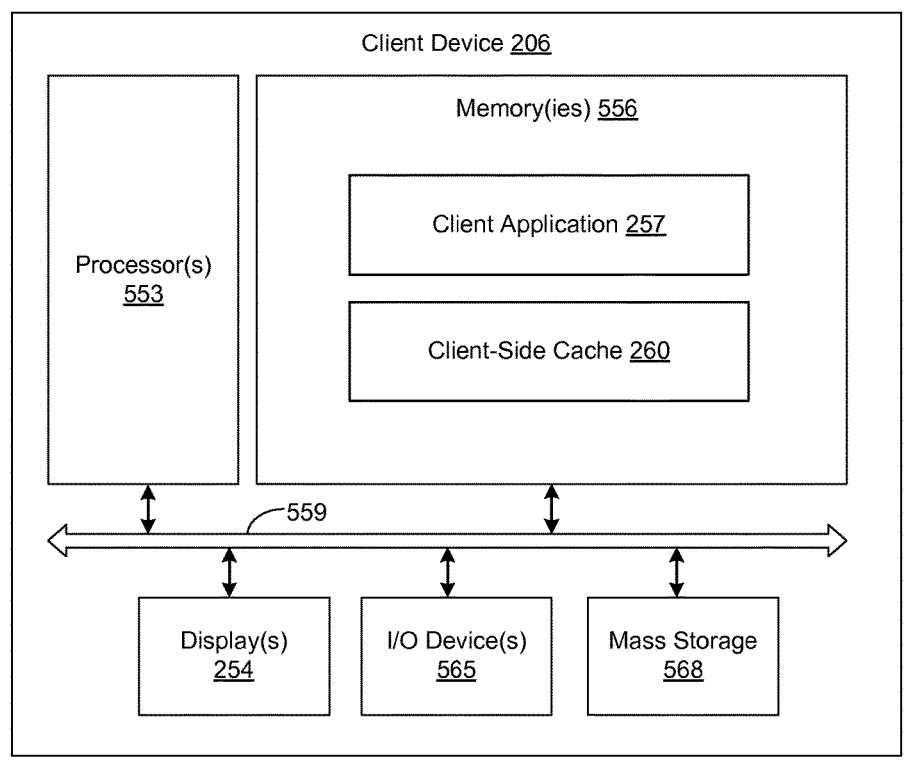
FIG. 6 is a schematic block diagram that provides one example illustration of a client device employed in the networked environment of FIG. 2 according to various embodiments of the present disclosure.

With reference to FIGS. 5 and 6, shown are schematic block diagrams of the computing environment 203 and client device 206 according to an embodiment of the present disclosure. The computing environment 203 includes one or more computing devices 500. Each computing device 500 and/or client device 206 includes at least one processor circuit, for example, having a processor 503, 553 and a memory 506, 556, both of which are coupled to a local interface 509, 559, respectively. As such, each computing device 500 may comprise, for example, at least one server computer or like device. A client device 206 may comprise a mobile device, smartphone, computing device, or like device. The local interface 509, 559 may comprise, for example, a data bus with an accompanying address/control bus or other bus structure as can be appreciated.

Stored in the memory 506, 556 are both data and several components that are executable by the processor 503, 553. In particular, stored in the memory 506 and executable by the processor 503 are the electronic commerce system 215, the user interface processing system 218, the user interface update service 221, and potentially other applications. Also stored in the memory 506 may be a data store 212 and other data. In addition, an operating system may be stored in the memory 506 and executable by the processor 503. Stored in the memory 556 and executable by the processor 553 are the client application 257 and potentially other applications. The client-side cache 260 and other data may also be stored in the memory 556.

It is understood that there may be other applications that are stored in the memory 506, 556 and are executable by the processor 503, 553 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506, 556 and are executable by the processor 503, 553. In this respect, the term "executable" means a program file that is in a form that can ultimately be run by the processor 503, 553. Examples of executable programs may be, for example, a compiled program that can be translated into machine code in a format that can be loaded into a random access portion of the memory 506, 556 and run by the processor 503, 553, source code that may be expressed in proper format such as object code that is capable of being loaded into a random access portion of the memory 506, 556 and executed by the processor 503, 553, or source code that may be interpreted by another executable program to generate instructions in a random access portion of the memory 506, 556 to be executed by the processor 503, 553, etc. An executable program may be stored in any portion or component of the memory 506, 556 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 556 is defined herein as including both volatile and nonvolatile memory and data storage components. Volatile components are those that do not retain data values upon loss of power. Nonvolatile components are those that retain data upon a loss of power. Thus, the memory 506, 556 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 553 may represent multiple processors 503, 553 and/or multiple processor cores and the memory 506, 556 may represent multiple memories 506, 556 that operate in parallel processing circuits, respectively. In such a case, the local interface 509, 559 may be an appropriate network that facilitates communication between any two of the multiple processors 503, 553, between any processor 503, 553 and any of the memories 506, 556, or between any two of the memories 506, 556, etc. The local interface 509, 559 may comprise additional systems designed to coordinate this communication, including, for example, performing load balancing. The processor 503, 553 may be of electrical or of some other available construction.

The client device 206 may include a display 254 that comprises, for example, one or more devices such as liquid crystal display (LCD) displays, gas plasma-based flat panel displays, organic light emitting diode (OLED) displays, LCD projectors, or other types of display devices, etc. The client device 206 may also include one or more input/output devices 565 that may include, for example, a capacitive touchscreen or other type of touch input device, fingerprint reader, keyboard, etc. Additionally, the client device 206 may also include some form of mass storage 568, which can comprise a hard drive, flash memory, or other storage devices.

Although the electronic commerce system 215, the user interface processing system 218, the user interface update service 221, the client application 257, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows an example of the functionality and operation of an implementation of portions of the client application 257. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 553 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the user interface processing system 218, the user interface update service 221, and the client application 257, that comprises software or code can be embodied in any non-transitory computer-readable medium for use by or in connection with an instruction execution system such as, for example, a processor 503, 553 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce system 215, the user interface processing system 218, the user interface update service 221, the client application 257, etc., may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500 and/or client device 206, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein, when executed, the program causes the at least one computing device to perform a method comprising:

receiving, by the at least one computing device, a selection of a product offered via an electronic catalog;

causing, by the at least one computing device, an initial view of a three-dimensional image of the product to be rendered upon a display;

identifying, by the at least one computing device, a plurality of control points on the three-dimensional image of the product, the plurality of control points being identified based at least in part on an image component recognition process that identifies a first plurality of product components in the initial view of the three-dimensional image of the product;

receiving, by the at least one computing device, a user manipulation of the three-dimensional image of the product, the user manipulation comprising a three-dimensional rotation of the three-dimensional image of the product;

causing, by the at least one computing device, an updated view of the three-dimensional image of the product to be rendered upon the display based at least in part on the user manipulation;

updating, by the at least one computing device, the plurality of control points on the three-dimensional image of the product based at least in part on the updated view of the three-dimensional image of the product in response to the three-dimensional rotation of the three-dimensional image of the product, the plurality of control points being updated based at least in part on the image component recognition process that identifies a second plurality of product components in the updated view of the three-dimensional image of the product;

dividing, by the at least one computing device, the updated view of the three-dimensional image into a plurality of Voronoi regions based at least in part upon the identified plurality of control points;

receiving, by the at least one computing device, a selection of a point upon the updated view of the three-dimensional image;

mapping, by the at least one computing device, the point to a specific Voronoi region of the plurality of Voronoi regions;

determining, by the at least one computing device, additional information related to the product that corresponds to the specific Voronoi region; and causing, by the at least one computing device, the additional information related to the product to be rendered upon the display.

2. The non-transitory computer-readable medium of claim 1, wherein the method further comprises causing, by the at least one computing device, a plurality of markers individually corresponding to the plurality of Voronoi regions to be rendered on top of the updated view of the three-dimensional image upon the display.

3. The non-transitory computer-readable medium of claim 1, wherein the additional information comprises at least one of: a customer review of the product, a description for a part of the product, a warranty for the product, or a manufacturer of the product.

4. The non-transitory computer-readable medium of claim 1, wherein updating the plurality of control points further comprises transforming, by the at least one computing device, the plurality of control points from a three-dimensional space into a two-dimensional space corresponding to the updated view of the product.

5. A system, comprising:
a computing device; and
at least one application executed in the computing device, the at least one application being configured to cause the computing device to perform a method comprising:
causing, by the computing device, an initial view of a three-dimensional image of an item to be rendered upon a display;
identifying, by the computing device, a plurality of selection regions on the three-dimensional image of the item, the plurality of selection regions being identified based at least in part on an image component recognition process that identifies a first plurality of item components in the initial view of the three-dimensional image of the item;
receiving, by the computing device, a user manipulation of the initial view of the three-dimensional image of the item, the user manipulation comprising a three-dimensional rotation of the three-dimensional image of the item;
causing, by the computing device, an updated view of the three-dimensional image of the item to be rendered upon the display based at least in part on the three-dimensional rotation of the three-dimensional image;
updating, by the computing device, the plurality of selection regions in the updated view of the three-dimensional image of the item responsive to at least the three-dimensional rotation of the three-dimensional image, the plurality of selection regions being updated based at least in part on the image component recognition process that identifies a second plurality of item components in the updated view of the three-dimensional image of the item;

associating, by the computing device, at least some additional information related to the item with each of the plurality of selection regions of the updated view of the three-dimensional image of the item;

receiving, by the computing device, a selection of a point upon the updated view of the three-dimensional image of the item;

mapping, by the computing device, the point to a specific selection region of the plurality of selection regions;

determining, by the computing device, the at least some additional information related to the item that corresponds to the specific selection region; and causing, by the computing device, the at least some additional information related to the item to be rendered upon the display.

6. The system of claim 5, wherein the updated view of the three-dimensional image of the item substantially fills the display.

7. The system of claim 5, wherein the specific selection region corresponds to a component of the item, and the at least some additional information related to the item pertains to the component of the item.

8. The system of claim 5, wherein the method further comprises causing, by the computing device, a plurality of respective markers corresponding to the plurality of selection regions to be rendered upon the display.

9. The system of claim 8, wherein individual ones of the plurality of respective markers are rendered relative to respective ones of a plurality of control points, individual ones of the plurality of control points corresponding to individual ones of the plurality of selection regions.

10. The system of claim 5, wherein the method further comprises requesting, by the computing device, data comprising the at least some additional information related to the item from a server based at least in part on receiving the selection of the point.

11. The system of claim 5, wherein the plurality of selection regions correspond to a plurality of Voronoi regions, and individual ones of the plurality of Voronoi regions are associated with a respective control point relative to the updated view of the three-dimensional image.

12. The system of claim 11, wherein the respective control point is specified in a three-dimensional space relative to the three-dimensional image.

13. The system of claim 5, wherein the display comprises a touchscreen, and the selection of the point comprises a user touch upon the touchscreen.

14. The system of claim 5, wherein the method further comprises:
receiving, by the computing device, a subsequent selection of another point upon the updated view of the three-dimensional image of the item;
mapping, by the computing device, the other point to a different selection region of the plurality of selection regions;
determining, by the computing device, other additional information related to the item that corresponds to the different selection region; and causing, by the computing device, the other additional information related to the item to be rendered upon the display.

15. The system of claim 14, wherein the method further comprises causing, by the computing device, the at least some additional information related to the item not to be rendered upon the display.

16. A method, comprising:

causing, by at least one computing device, an initial view of a three-dimensional image of an item to be rendered upon a display;

identifying, by the at least one computing device, a plurality of selection regions on the three-dimensional image of the item, the plurality of selection regions being identified based at least in part on an image component recognition process that identifies a first plurality of item components in the initial view of the three-dimensional image of the item;

receiving, by the at least one computing device, a user manipulation of the initial view of the three-dimensional image of the item, the user manipulation comprising a three-dimensional rotation of the three-dimensional image of the item;

updating, by the at least one computing device, the plurality of selection regions of the three-dimensional image of the item on an updated view rendered in the display responsive to the three-dimensional rotation of the three-dimensional image, the plurality of selection regions being updated based at least in part on the image component recognition process that identifies a second plurality of item components in response to the three-dimensional rotation of the three-dimensional image of the item;

receiving, by the at least one computing device, a selection of a first point upon the three-dimensional image of the item, wherein the first point is in one of the plurality of selection regions;

requesting, by the at least one computing device, additional information related to the item from a server based at least in part on the selection of the first point in the one of the plurality of selection regions, the additional information being mapped to the first point by way of an association with a control point upon the three-dimensional image that corresponds to the one of the plurality of selection regions; and causing, by the at least one computing device, the additional information related to the item to be rendered upon the display.

17. The method of claim 16, further comprising:

storing, by the at least one computing device, the additional information related to the item in a cache;

receiving, by the at least one computing device, a selection of a second point upon the three-dimensional image of the item; and loading, by the at least one computing device, the additional information related to the item from the cache based at least in part on the selection of the second point.

18. The method of claim 16, further comprising:

receiving, by the at least one computing device, a selection of a second point upon the three-dimensional image of the item; and causing, by the at least one computing device, the additional information related to the item not to be rendered upon the display.

19. The method of claim 16, wherein the one of the plurality of selection regions comprises a Voronoi region, and the method further comprises:

determining, by the at least one computing device, that the first point is within the Voronoi region.

20. The method of claim 16, wherein dividing, by the at least one computing device, the three-dimensional image of the item into the plurality of selection regions further comprises:

identifying, by the at least one computing device, a plurality of control points based at least in part on the three-dimensional image;

generating, by the at least one computing device, a plurality of Voronoi regions into which the three-dimensional image is divided based at least in part on the identified plurality of control points; and associating, by the at least one computing device, at least some of the additional information related to the item with individual ones of the plurality of Voronoi regions.

\* \* \* \* \*